US012788045B2

(12) United States Patent
Rabinowitz

(10) Patent No.: US 12,788,045 B2
(45) Date of Patent: Nov. 10, 2026

(54) NUTRIENT EMULSIONS FOR IMPROVED IRON ABSORPTION

(71) Applicant: Jake Rabinowitz, Glendale, NY (US)

(72) Inventor: Jake Rabinowitz, Glendale, NY (US)

( * ) Notice: Subject to any disclaimer, the term of this patent is extended or adjusted under 35 U.S.C. 154(b) by 356 days.

(21) Appl. No.: 18/473,987

(22) Filed: Sep. 25, 2023

(65) Prior Publication Data

US 2025/0098722 A1 Mar. 27, 2025

(51) Int. Cl.

| | |
|---|---|
| ***A23L 33/21*** | (2016.01) |
| ***A23B 2/40*** | (2025.01) |
| ***A23L 33/12*** | (2016.01) |
| ***A23L 33/135*** | (2016.01) |
| ***A23L 33/15*** | (2016.01) |
| ***A23L 33/165*** | (2016.01) |
| ***A23P 10/20*** | (2016.01) |

(52) U.S. Cl.

CPC .............. *A23L 33/165* (2016.08); *A23B 2/40* (2025.01); *A23L 33/12* (2016.08); *A23L 33/135* (2016.08); *A23L 33/15* (2016.08); *A23L 33/21* (2016.08); *A23P 10/20* (2016.08)

(58) Field of Classification Search

CPC .......... A61K 8/022; A61K 8/06; A61K 8/062; A23V 2200/3204; A23V 2250/1592; A23V 2200/30; A23L 35/10; A23L 33/21; A23L 27/84

USPC ............................ 424/439; 426/601, 602, 74

See application file for complete search history.

(56) References Cited

U.S. PATENT DOCUMENTS

2012/0135125 A1* 5/2012 Muschiolik ............ A23F 5/243
426/602

* cited by examiner

*Primary Examiner* — Hong T Yoo

(57) ABSTRACT

According to some aspects of the present disclosure, a nutrient emulsion is disclosed. The nutrient emulsion comprises an iron component present at a mass ratio of at least 0.03%, an ascorbic acid component present at a mass ratio of at least 25 times the mass ratio of the iron component, a water component present at a mass ratio from 0.5% to 5.0%, at least one of a lecithin component at a mass ratio of from 0.5% to 10%, or a fiber component at a mass ratio of from 0.5% to 10.0%; and a balance being one or more oil components and impurities.

13 Claims, 7 Drawing Sheets

NUTRIENT EMULSIONS FOR IMPROVED IRON ABSORPTION

BACKGROUND

The present disclosure generally relates to nutrient emulsions for improved iron absorption. In some embodiments, the iron is intended for individuals with low iron or anemia.

SUMMARY

Iron is an essential nutrient and low iron is the world's most common nutrient deficiency. A typical solution to low iron is to administer very high doses of a poorly absorbed iron supplement. This solution is inadequate for many people, including those who cannot tolerate the high doses of iron, have absorption issues, and/or have compounding nutrient deficiencies contributing to their low iron state.

Accordingly, nutrient emulsions are disclosed herein for improved iron absorption. In some embodiments, the nutrient emulsions contain highly absorbed iron that is easily tolerated to avoid side effects.

In accordance with a first embodiment of the present disclosure, a nutrient emulsion is disclosed. The nutrient emulsion includes an iron component present at a mass ratio of at least 0.03%, an ascorbic acid component present at a mass ratio of at least 25 times the mass ratio of the iron component, a water component present at a mass ratio from 0.5% to 5.0%, at least one of a lecithin component at a mass ratio of from 0.5% to 10%, or a fiber component at a mass ratio of from 0.5% to 10.0%; and a balance being one or more oil components and impurities.

In a first aspect of that first embodiment, the emulsion also includes at least one protein component at a mass ratio of from 15.0% to 50.0%.

In a second aspect of that first embodiment, the emulsion also includes at least one carbohydrate component at a mass ratio of from 15.0% to 50.0%.

In a third aspect of that first embodiment, the iron is one of: ferrous glycinate, ferric glycinate, ferrous gluconate, ferric citrate, ferric ascorbate, ferrous protein succinylate, or heme iron derived from animal tissue.

In a fourth aspect of that first embodiment, the emulsion also includes at least one transition metal at a mass ratio of from 0.05 to 0.25 times the mass ratio of the iron component, wherein the at least one transition metal is at least one of: zinc, copper, cadmium, manganese, and chromium.

In a fifth aspect of that first embodiment, the emulsion also includes folic acid, methylcobalamin, cholecalciferol, tocopheryl acetate, selenium, and magnesium at respective mass ratios of 0.022, 0.00044, 0.0011, 1.1, 0.0016, and 8.3 times the mass ratio of the iron component.

In a sixth aspect of that first embodiment, the emulsion also includes inositol at a mass ratio of at least 1.0%.

In a seventh aspect of that first embodiment, the emulsion also includes at least one antioxidant at a mass ratio of at least 0.1%, wherein the at least one antioxidant is at least one of: glutathione, methoxatin, taurine, carnitine, lutein, glutamine, docosahexaenoic acid, lycopene, carotene, and resveratrol.

In an eighth aspect of that first embodiment, the lecithin is at least one of: soy lecithin, sunflower lecithin, and egg yolk lecithin.

In a ninth aspect of that first embodiment, the fiber is at least one of: gum arabic, pectin, fructooligosaccharides, galactooligosaccharides, human milk oligosaccharides and inulin.

In a tenth aspect of that first embodiment, the emulsion is dried into a powder.

In a second iteration of that tenth aspect, the dried powder is agglomerated into a powder with a larger particle size and greater porosity.

In an eleventh aspect of that first embodiment, the emulsion additionally includes at least one probiotic organism at a quantity of at least 1e9 CFU, wherein the at least one probiotic organisms is at least one of: *B subtilis, L rhamnosus, L acidophilus, B lactis, B infantis, B breve, B longum, B bifidum, S salivarius.*

In accordance with a second embodiment of the present disclosure, a nutrient emulsion includes the components and respective component mass ratios listed in Table 1.

In accordance with a third embodiment of the present disclosure, a method for making a nutrient emulsion powder is disclosed. The method includes mixing water and a batch of ingredients into a wet blend, the batch of ingredients including an iron component at a mass ratio of at least 0.03%, an ascorbic acid component at a mass ratio of at least 25 times the mass ratio of the iron component, a water component at a mass ratio of from 0.5% to 5.0%, at least one of a lecithin component at a mass ratio of from 0.5% to 10.0%, or a fiber component at a mass ratio of from 0.5% to 10.0%, and a balance of ingredients being one or more oil components and impurities. The method also includes pasteurizing the wet blend, homogenizing the pasteurized wet blend, and spray drying the homogenized wet blend into the nutrient emulsion powder. In some embodiments, the method also includes agglomerating the nutrient emulsion powder, during which at least one of a carbohydrate component, a lecithin component, or a fiber component may be added. In some embodiments, the method also includes dry blending the nutrient emulsion powder, during which one or more probiotic organisms are added, the one or more probiotic organisms being at least one of: *B subtilis, L rhamnosus, L acidophilus, B lactis, B infantis, B breve, B longum, B bifidum, S salivarius*. In some embodiments, the batch of ingredients also includes at least one protein component at a mass ratio of from 15.0% to 50.0%. In some embodiments, e batch of ingredients also includes at least one carbohydrate component at a mass ratio of from 15.0% to 50.0%.

BRIEF DESCRIPTION OF THE DRAWINGS

Within the following description is a discussion of the following figures, which are provided as exemplary embodiments of the present disclosure. Accordingly, the figures should be viewed as example embodiments and not limitations of the present disclosure.

DETAILED DESCRIPTION

Figure 1:
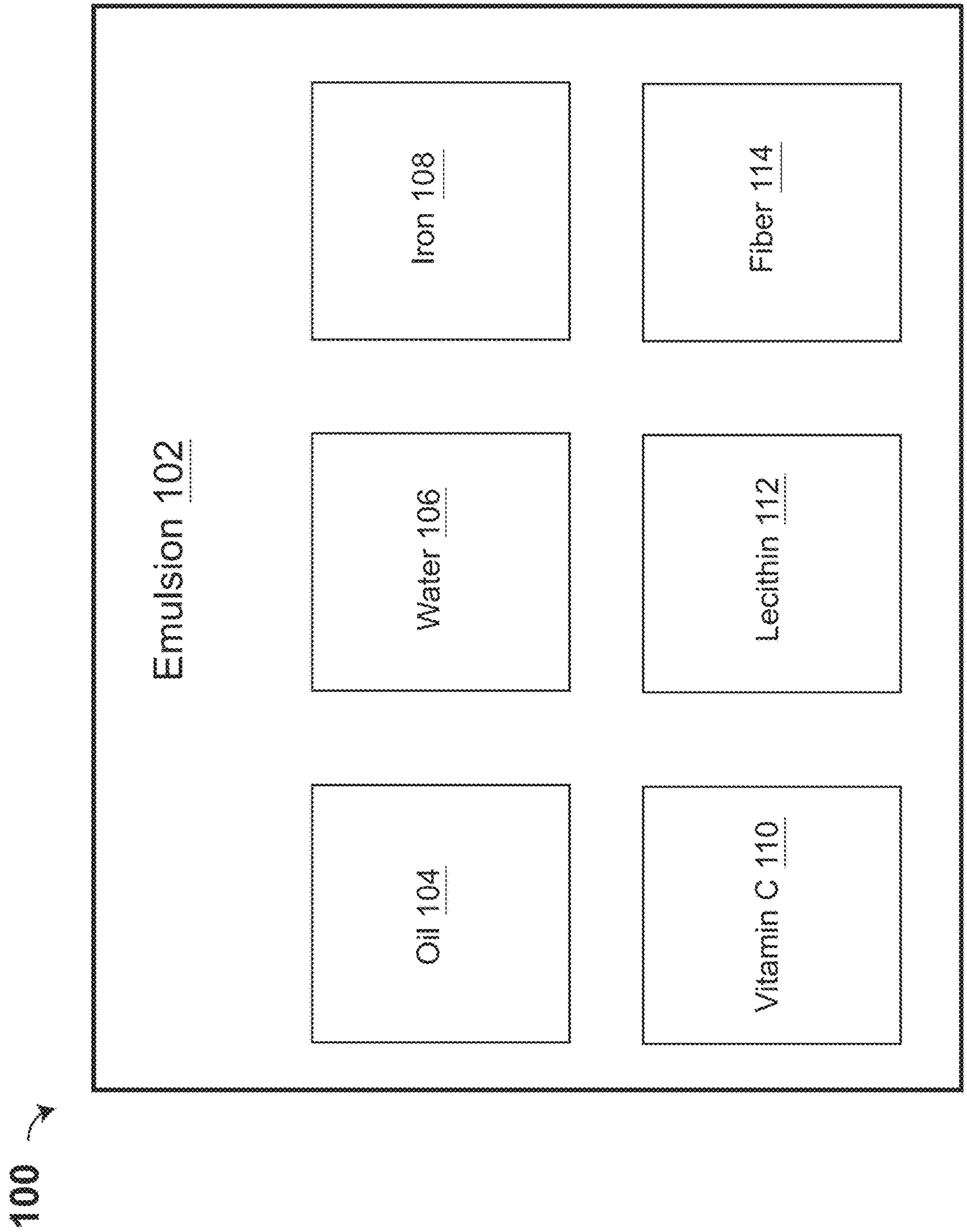
FIG. 1 shows a first nutrient emulsion for improved iron absorption, according to some embodiments of the present disclosure.

Iron supports normal biological activity including regulation of circulatory, respiratory, neurological, hormonal, digestive, musculoskeletal, immunological, and other functions. When ingested, the bioavailability of the iron varies according to at least the molecular state of the iron, an individual's physiology, and the possible presence of other nutrients that enhance or inhibit iron absorption. As used herein, the "bioavailability" or "absorption" of iron may interchangeably refer to the fraction of ingested elemental iron that is used to synthesize blood or stored in ferritin. Iron absorption may be inhibited due to anti-nutrients making iron unavailable at a primary absorption site (e.g., duodenum, jejunum), at a secondary absorption site (e.g., colon), or at other absorption sites. Iron absorption may be enhanced due to pro-nutrients making iron available for absorption (e.g., by chelating ferric iron) or storage (e.g., by providing amino acids for synthesizing ferritin).

In humans, low iron may describe any state where normal biological functions are disrupted due to a deficiency of in vivo iron availability. Low iron can cause symptoms including, but not limited to, fatigue, depression, weakness, shortness of breath, hormone dysregulation, dizziness, photopsia, amplified ecchymosis, restless legs, pale skin, brittle nails, hair loss, poor appetite, feeling cold, odd cravings, mouth sores, and gastrointestinal dysregulation.

Despite the myriad symptoms of low iron and its documented discovery in the 19th century, low iron remains extremely prevalent in the US and worldwide. Anemia, which is often a manifestation of low iron (i.e., iron deficiency anemia) is estimated to affect ~6% of the US population and ~33% of the global population. These values understate the prevalence of low iron, because low iron does not necessarily result in anemia. Notably, low iron symptoms initiate in many patients whose iron levels are above clinically recognized thresholds for diagnosing low iron.

Low iron is prevalent in at least people who are pregnant or nursing (due to providing iron to the growing baby), people who experience regular blood loss such as due to menstruation (due to requiring more iron for erythropoiesis), children (due to poor diet and/or lacking iron stores), teens (due to rapid growth), elders (due to poor diet and/or inflammation), people who are ill (due to infection, inflammation, internal bleeding, gastrointestinal dysfunction, reactions to medication, or any combination thereof), runners (due to inflammation and hemolysis), vegetarians/vegans (due to lack of dietary intake), and bariatric patients (due to removal of small intestine).

For individuals with low iron, iron supplementation may be helpful to raise iron levels. However, iron supplementation often causes adverse side effects including constipation, nausea, bloating, indigestion, and/or diarrhea. These adverse effects of iron supplementation may outweigh the benefits of improved iron levels, such that many people choose to live with chronically low iron rather than maintain supplementation.

Anemia, particularly iron deficiency anemia, is a condition diagnosed by a lack of healthy red blood cells. When an individual's low iron status has progressed to anemia, additional nutrients may be required to restore normal iron and physiological status. Among these other nutrients are vitamins B9 (i.e., folate) B12, C, D, and E, selenium, and magnesium.

There remains a massive and urgent need for nutrition packages that administer iron in a form that maximizes bioavailability, ensures tolerance, and simultaneously addressing other dietary (e.g., additional nutrient deficiencies) and physiological (e.g., causes of iron malabsorption) conditions affecting the low iron individual.

In accordance with embodiments of the present disclosure, nutrient emulsions are provided for delivering bioavailable iron. Bioavailable iron chelates are dissolved in water. The water is incorporated into the water phase of a water-in-oil emulsion. In some embodiments, the emulsions have more than two phases (e.g., oil-in-water-in-oil emulsions, water-in-oil-in-water-in-oil emulsions, and emulsions with greater number of phases). Within these nutrient emulsions having two or more phases, any outer phase (such as the oil of a water-in-oil emulsion) may include one or more discrete units of its respective inner phase (e.g., the water of a water-in-oil emulsion).

Due to being dissolved in a water phase and encapsulated by an oil phase of the emulsion, the ingested iron is prevented from releasing in stomach fluid and/or upper gastrointestinal lining (e.g., preceding the small intestine). Thus, the bioavailable iron is less exposed to malabsorption by diffusion into cells that do not reside at primary physiological iron absorption sites. Such absorption leads to the generation of free radicals via the Fenton reaction, which are toxic to the body. In contrast, the bioavailable iron is delivered, during normal digestive transit, within the emulsion to the small intestine, wherein the oil phase is digested by at least enzymes and microbes. In response to digestion of the oil phase, the water-dissolved bioavailable iron is released in the small intestine near iron absorption sites at the proximal jejunum and duodenum.

To further enhance iron absorption, vitamin C is additionally included in the water phase of the emulsion with at least an 8:1 molar ratio of vitamin C (i.e., ascorbic acid) to elemental iron. This vitamin C forms a soluble chelate complex with iron, particularly ferric iron, in response to iron being released from its as-sourced carrier molecule (e.g., glycine, gluconate) during emulsion preparation and/or within the digestive tract. This vitamin C-iron chelate is soluble in the alkaline environment of the small intestine, where duodenal iron absorption membranes reduce ferric iron to ferrous iron and then shuttle the ferrous iron inside corresponding cells, thus completing intestinal uptake.

At least one lecithin and at least one fiber (e.g., at least one of gum, pectin, inulin, or oligosaccharides) are additionally included in the nutrient emulsion to stabilize its external interface and its at least one internal phase interface. The ensuing highly stabilized emulsion is protected against de-emulsification during processing, storage, digestion, or any combination thereof. The fiber additionally serves to improve iron bioavailability by providing prebiotic nutrient that supports probiotic microbes in the GI tract, as further described below.

In some embodiments, at least one transition metal is included to activate ion channels that uptake iron, including at the proximal jejunum and duodenum.

In some embodiments, at least one antioxidant is included to provide anti-inflammatory effects. Inflammation can initiate immune responses, including expression of hepcidin, that lower iron absorption. Therefore, in some embodiments, antioxidants are included to improve iron absorption.

In some embodiments, at least one nutrient to support the gut microbiome (e.g., a prebiotic fiber, probiotic organism, or a medium-chain fat) is included to regulate immune responses that reduce iron absorption. In immune response to an infection or related pathogenesis, iron levels may be reduced to “starve out” the pathogenic agent. Therefore, nutrients that support the gut microbiome may improve iron absorption.

In some embodiments, at least one nutrient to support hormone regulation (i.e., inositol, an omega-3 PUFA, or an essential vitamin/mineral) is included to regulate the levels of hormones that regulate iron absorption. For example, hepcidin is a hormone that inhibits iron absorption. Therefore, nutrients that regulate hormone production (e.g., by lowering hepcidin levels) may improve iron absorption.

In some embodiments of the present disclosure, emulsions deliver the iron in a bioavailable package, deliver the iron along with synergistic nutrients that enhance bioavailability, protect the iron from environmental stress prior to administration, stabilize the iron from emulsion formation through digestive transit to iron absorption sites, co-deliver the iron with other beneficial nutrients, and more.

In the present disclosure, an emulsion is a multi-phase system (i.e., two or more phases) wherein at least one stable particle of a first phase (e.g., water) is encapsulated by a stable particle of a second phase (e.g., oil). In some embodiments, the at least one stable particle of a first phase may further encapsulate one or more stable particles of a third phase (e.g., oil), where the third phase particles may be smaller masses of the second phase material. These encapsulated particles of the third phase may further encapsulate stable particles of a fourth phase, where the fourth phase particles may be smaller masses of the first phase material, and so on. Each stable particle of an emulsion may be any size, and is typically in the range of 10 nm through 100 μm.

In some embodiments of the present disclosure, an emulsion is formed through a multi-step process including batching nutrients in water and homogenizing the nutrients. The homogenization step incorporates disparate nutrients of the emulsion into a stable emulsion particle. Nutrients including lecithin and fiber (e.g., gum or pectin) are soluble in both phases of the emulsion and thus stabilize the emulsion particle by bridging internal (e.g., two-phase) and external interfaces of the emulsion. Excluding lecithin and fiber, most other nutrients are soluble in one, but not both, of the phases composing the emulsion particle. Therefore, the emulsion is required to deliver diverse water- and oil-soluble nutrients within a single consumable package.

Aspects of the present subject matter may be better understood with reference to FIGS. 1-7. As used herein, a mass ratio refers to the wt/wt % ratio describing the mass of a respective emulsion component over the total mass of the emulsion.

FIG. 1 shows a nutrient emulsion 102 including oil 104, water 106, iron 108, vitamin C 110, lecithin 112, and fiber 114.

Oil 104 may include saturated fat, unsaturated fat, or a combination thereof. Oil 104 may include oils derived from coconut, soy, canola, peanut, sesame, palm, olive, sunflower, safflower, flaxseed, avocado, hempseed, almond, or a combination thereof. In some embodiments, the emulsion 102 includes oil 104 at a mass ratio of at least 50%. In some embodiments, the emulsion 102 includes oil 104 at a mass ratio of at least 15%. It will be understood that the mass ratio of oil 104 affects the stability of nutrient emulsion 102 and the required mass ratios of additional elements (i.e., lecithin 112 and fiber 114) used for stabilization. In some embodiments, oil 104 is present at a mass ratio that is the balance of the other components of emulsion 102 (i.e., oil 104 is present at a mass ratio that is equal to 100% less the sum of the mass ratios of each other component of emulsion 102), prior to accounting for impurities.

Water 106 may include tap water, deionized water, reverse osmosis water, distilled water, or demineralized water. It will be understood that a type of water may affect the stability of nutrient emulsion 102 and the required quantities of stabilizing elements (i.e., lecithin 112 and fiber 114). The type of water may affect the stability of nutrient emulsion 102 due to altering liquid solution properties such as pH or hardness. In some embodiments, the emulsion 102 includes water 106 at a mass ratio of 0.5% to 5%. In some embodiments, water 106 is included at a higher ratio of 5-50%. In some embodiments, nutrient emulsion 102 is formed in a continuous media of water, after which the continuous media of water is removed (e.g., by drying) and the only remaining mass of water 106 is encapsulated within an oil 104 phase of nutrient emulsion 102.

Iron 108 includes any chelated iron or iron salt. In some embodiments, iron 108 is a chelated iron such as ferrous glycinate, ferric glycinate, ferrous gluconate, ferric citrate, ferric ascorbate, ferrous protein succinylate, heme iron derived from animal tissue, or any combination thereof. In some embodiments, emulsion 102 includes iron 108 at a mass ratio of at least 0.03%. In some embodiments, emulsion 102 includes iron 108 at a mass ratio of at least 0.1% or at least 1.0%. The water-soluble chelated iron 108 dissolves in the water 106 phase of the nutrient emulsion 102 and is encapsulated by the oil 104 phase. The oil 104 encapsulation of the iron 108 prevents ex vivo and in vivo iron oxidation and promotes in vivo iron bioavailability due to oil 104 being metabolized by enzymes, microbes, and other agents in the small intense at or near the primary site of physiological iron absorption. Therefore, the emulsion 102 provides iron 108 in a nutrient package designed to release the iron 108 at the primary site of iron absorption.

Vitamin C 110 is ascorbic acid. Vitamin C 110 further improves the bioavailability of iron 108 by forming iron chelates, i.e., ferrous ascorbate or ferric ascorbate. In some embodiments, such chelates may form during the homogenization process and reside in the water 106 phase. In some embodiments, such chelates may form in response to the dissolution of iron 108 during ingestion and/or digestion. At gastrointestinal pH, a chelated compound of iron 108 and vitamin C 110 protects iron 108 against oxidation and thus facilitates transport to the small intestine, where the iron 108 may be absorbed for physiological use. In some embodiments, the nutrient emulsion 102 includes vitamin C 110 with at least a 25× mass ratio of vitamin C 110 with respect to iron 108. In some embodiments, the mass ratio of vitamin C 110 may only be 10× with respect to iron 108. With these proportional mass ratios or higher proportional mass ratios of vitamin C to iron, the chelation of iron 108 by vitamin C 110 is maximized, and the bioavailability of iron 108 is therefore maximized.

Lecithin 112 and fiber 114 stabilize oil-water interfaces within the nutrient emulsion 102 particle. In some embodiments, these nutrients may also stabilize oil-water or oil-air interfaces at the exterior of the nutrient emulsion 102 particle. In some embodiments, the nutrient emulsion 102 includes at least one of lecithin 112 or fiber 114 at a mass ratio of at least 0.5%. In some embodiments, the emulsion may include at least one of lecithin 112 or fiber 114 at a mass ratio of at least 5% or 10%. It will be understood that the quantity of lecithin 112 or fiber 114, type of lecithin 112

(e.g., soy, sunflower, egg yolk, peanut, or wheat germ lecithin) or fiber 114 (e.g., orange peel pectin, apple peel pectin, lemon peel pectin, lime peel pectin, high-methoxyl pectin, low-methoxyl pectin, amidated pectin, sugar beet pectin, gum arabic, inulin, or any one or more oligosaccharides), ratio of lecithin 112 or fiber 114 to oil 104, ratio of lecithin 112 or fiber 114 to water 106, ratio of lecithin 112 to fiber 114, and type of lecithin 112 or fiber 114, affect the emulsion stability and the required quantities of lecithin 112 and/or fiber 114 for stabilization.

In some embodiments, including those where nutrient emulsion 102 is a powder, lecithin 112 and fiber 114 may further improve the bioavailability of iron 108 by yielding a nutrient emulsion 102 that is more soluble when mixed in a ready-to-drink liquid (e.g., water, milk, plant milk, coffee, tea, juice).

In some embodiments, nutrient emulsion 102 is dried to a powder, such as to facilitate transport and diversify its usability. As a dried powder, nutrient emulsion 102 provides bioavailable iron 108 upon being mixed in potable liquid or edible food. In some embodiments, the dry powder nutrient emulsion 102 has a density of about 0.55 g/mL and an average particle size of about 80 micrometers. In some embodiments, dried power nutrient emulsion 102 is agglomerated to increase its particle size (e.g., to over 100 micrometer) and porosity. These effects may improve its ability to dissolve when mixed in potable liquid or edible food.

Figure 2:
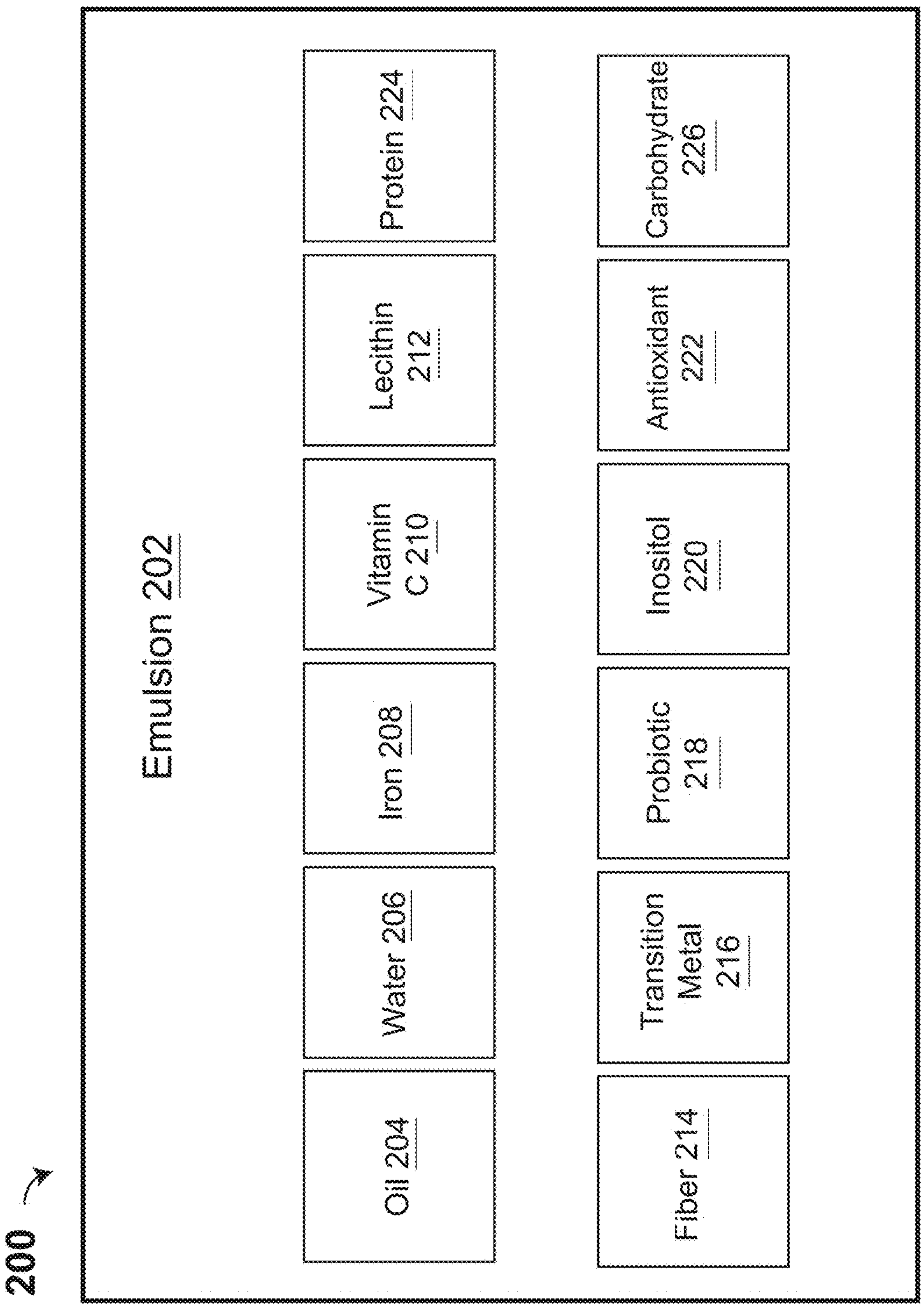
FIG. 2 shows a second nutrient emulsion for improved iron absorption, according to some embodiments of the present disclosure.

FIG. 2 shows a nutrient emulsion 202 including oil 204, water 206, iron 208, vitamin C 210, lecithin 212, fiber 214, transition metal 216, probiotic 218, inositol 220, antioxidant 222, protein 224, and carbohydrate 226, according to some embodiments of the present disclosure. Compared to the elements of nutrient emulsion 102, the added elements of nutrient emulsion 202 synergistically realize additional improvements in the bioavailability of the iron 208. In some embodiments, each of oil 204, water 206, iron 208, vitamin C 210, lecithin 212, and fiber 214, may be oil 104, water 106, iron 108, vitamin C 110, lecithin 112, fiber 114, protein 116, and carbohydrate 118, respectively.

One or more transition metal 216 (e.g., zinc, copper, cadmium, manganese, and chromium) may increase the absorption of iron 208 by activating iron transporter proteins (e.g., DMT1, FPN1) that facilitate transport of serum iron across cell membranes at iron absorption sites (e.g., the small intestine mucosal layer at the duodenum, the small intestine mucosal layer at the jejunum, the colon mucosal layer, any other iron absorption site, or any combination thereof). The one or more transition metal 216 may activate iron transporter proteins through increased expression of mRNA encoding iron transporter proteins (e.g., MTF-1). The one or more transition metal 216 may realize further synergistic benefits, such as supporting the immune system, suppressing infectious agents, and more; these benefits may further contribute to the bioavailability of iron 208, as described in more detail below. In some embodiments, the transition metal 216 is present at a quantity of 0.05× to 0.25× the moles of the iron 208. In some embodiments, the transition metal 216 is present at 0.05× to 0.25× the mass ratio of the iron 208.

One or more probiotic 218 (e.g., *B subtilis, L rhamnosus, L acidophilus, B lactis, B infantis, B breve, B longum, B bifidum, S salivarius*) may increase the bioavailability of iron 208 by regulating the gut microbiome (e.g., microflora) and related processes (e.g., appetite, hormone regulation, neurotransmitter expression), supporting the immune system, suppressing infectious agents, and proliferating colonic flora that digest fats at a secondary iron absorption site (e.g., the colon), or any combination thereof. The one or more probiotic 218 regulate the gut microbiome by suppressing pathogenic microbes (e.g., by outcompeting them for metabolites) and supporting beneficial microbes (e.g., by generating metabolites preferred by beneficial microbes, such as the probiotics 218 and other microbes). The one or more probiotics 218 further synergistically interact with the one or more fibers 214, wherein the latter serve as prebiotic nutrients that are digestible by probiotic microbes, including the one or more probiotics 218. The fiber helps to seed and proliferate colonies of beneficial microbes. In some embodiments, the emulsion 202 may comprise at least 1e9 CFU of the one or more probiotic 218. Immune support due to the one or more probiotic 218 may improve the bioavailability of iron 208 by suppressing an immune response wherein pathogenic microbes (which require iron in their physiology) are starved out by way of reduced in vivo iron availability. In some embodiments, nutrient emulsion 202 is dried into a powder and probiotic 218 is dry blended into the dried powder. In some embodiments, probiotic 218 is present at a quantity of at least 1e9 colony forming units (CFUs).

Inositol 220 increases the bioavailability of iron 208 by anti-inflammatory action (e.g., suppression of IL-6 or IL-22), by suppressing hepcidin levels (e.g., by suppressing HAMP signaling, e.g., by forming compounds with growth factors such as PI3K), or by a combination thereof. Inositol 220 may further increase the bioavailability of iron 208 by regulating hormonal cycles, including hepcidin expression, and by regulating digestive processes. Inositol may include myo-inositol, d-chiro-inositol, inositol hexaphosphate, inositol triphosphate, inositol nicotinate, or any combination thereof. In some embodiments, inositol 220 respectively includes myo-inositol and d-chiro-insoitol, where the former is at a 40× mass ratio with respect to the latter. In some embodiments, inositol 220 may further mitigate symptoms of hormonal dysregulation, including PCOS. In some embodiments, inositol 220 is present at a mass ratio of at least 1.0%.

One or more antioxidant 222 (e.g., glutathione, methoxatin, taurine, carnitine, lutein, glutamine, docosahexaenoic acid, lycopene, carotene, and resveratrol) increase the bioavailability of iron 208 by anti-inflammatory action (e.g., suppression of IL-1, IL-6, or IL-22), including by reducing gastrointestinal and musculoskeletal inflammation. Inflammatory cytokines such as IL-1, IL-6, and IL-22 reduce iron absorption, including by upregulating expression of hepcidin. Therefore, suppressing these cytokines may increase the bioavailability of iron 208. The one or more antioxidants 222 further serve to reduce pain as is caused by low iron and/or anemia. In some embodiments, antioxidant 222 is present at a mass ratio of at least 0.1% or at least 1.0%.

Protein 224 (e.g., isolates or concentrates of casein, whey, collagen, soy protein, rice protein, pea protein, bean protein, legume protein, hemp protein, egg protein, and seed protein) and carbohydrate 226 (e.g., sucrose, allulose, mogrosides, erythritol, human milk oligosaccharides, short-chain fructooligosaccharides, long-chain fructooligosaccharides, galactooligosaccharides, xylooligosaccharides, and isomalto-oligosaccharides) may result in nutrient emulsion 202 having a macronutrient composition of a complete meal (i.e., all macronutrient groups are included). The complete macronutrient composition may improve the bioavailability of iron 208 by stimulating a complete set of metabolic initiation pathways, including metabolic absorption pathways of iron 208. Protein 224 may further improve the bioavailability of iron 208 by providing essential amino acids that are involved in the storage of iron 208 as ferritin.

Carbohydrate 226 may further improve the bioavailability of iron 208 by stabilizing at least one of the interface (e.g., external or internal) of the emulsion through the addition of "wall" material (i.e., material that can bind to elements of an oil-water or oil-air interface). In some embodiments, protein 224 and carbohydrate 226 are each included in nutrient emulsion 202 at a mass ratio of at least 15%.

Figure 3:
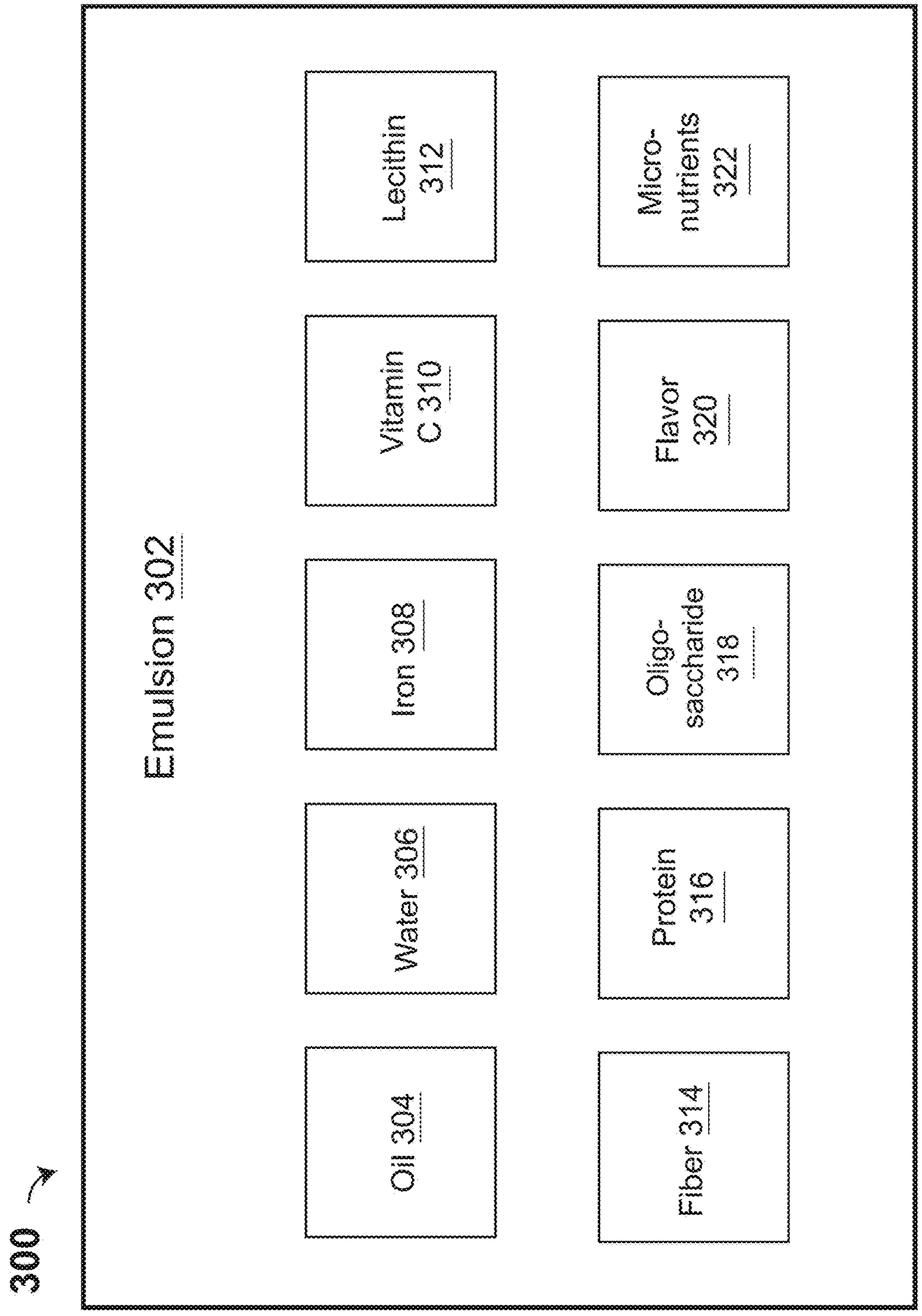
FIG. 3 shows a third nutrient emulsion for improved iron absorption, according to some embodiments of the present disclosure.

FIG. 3 shows a nutrient emulsion 302 including oil 304, water 306, iron 308, vitamin C 310, lecithin 312, fiber 314, protein 316, oligosaccharide 318, flavor 320, and micronutrients 322, according to some embodiments of the present disclosure. In some embodiments, emulsion 302 represents either of emulsion 202 or 102 including additional elements. Compared to the elements of nutrient emulsion 102 and 202, the added elements of nutrient emulsion 302 result in a nutrient profile that is even more comparable to a meal replacement (i.e., all essential macronutrients and micronutrients are present). In some embodiments, each of oil 304, water 306, iron 308, vitamin C 310, lecithin 312, fiber 314, protein 316, and oligo-saccharide 318 or flavor 320 may be oil 104, water 106, iron 108, vitamin C 110, lecithin 112, fiber 114, protein 226, or carbohydrate 228, respectively. In some embodiments, these quantities are adjusted in response to how the combination of all the components of emulsion 302 influences the bioavailability of iron 308 and/or the stability of emulsion 302.

Oligosaccharide 318 (e.g., fructooligosaccharides, galactooligosaccharides, human milk oligosaccharides, xylooligosaccharides, isomaltooligosaccharides, or any combination thereof) provides prebiotic fiber that is supplemental to fiber 314 (e.g., at least one of gum or pectin). In some embodiments, the oligosaccharide 318 delivers more mass of prebiotic fiber than fiber 314. In some embodiments, oligosaccharide 318 provides soluble fiber. The fiber from oligosaccharide 318 may provide metabolites for the same microbes as fiber 314, and it may provide metabolites for other probiotic microbes. In some embodiments, oligosaccharide 318 improves the bioavailability of iron 308 due to supporting probiotic microbes, as discussed above and as further discussed below. In some embodiments, oligosaccharide 318 is present at a mass ratio of at least 10%.

Flavor 320 (e.g., sucrose, lactose, allulose, vanilla, cacao, berry, orange, coffee, tea, cinnamon, sugar, allulose, citrus, mint, monk fruit, erythriol, and honey) may include carbohydrate molecules that further stabilize emulsion 302 by providing wall material. Flavor 320 also improves the taste of nutrient emulsion 302, which results in improved tolerance of the emulsion after ingestion. In some embodiments, flavor 320 is present at a mass ratio of at least 10%.

Micronutrients 322 (e.g., vitamin A, vitamin D, vitamin E, vitamin K, thiamin, riboflavin, niacin, vitamin B6, vitamin B9, vitamin B12, biotin, pantothenic acid, choline, calcium, phosphorus, iodine, selenium, potassium, transition metal 216, probiotic 218, inositol 220, antioxidant 222, or any combination thereof) promote absorption of iron 308, address nutrition deficiencies that often occur parallel to iron deficiency, and provide additional physiological benefits. For example, vitamins B9 (i.e., a form of folate) and B12 (i.e., a form of cobalamin) are involved in erythropoiesis, such that deficiencies in those vitamins can resemble or contribute to iron deficiency. In some embodiments, micronutrients 322 improve the bioavailability of iron 308 due to stimulating its absorption (e.g., transition metals), stimulating its use (e.g., vitamins B9 and B12), or addressing other factors related to malabsorption (e.g., probiotic 218, inositol 220, antioxidant 222). In some embodiments, folic acid, cobalamin, cholecalciferol (i.e., vitamin D), tocopheryl acetate (i.e., Vitamin E), selenium, and magnesium are present at respective quantities of 0.022×, 0.00044×, 0.0011×, 1.1×, 0.0016×, and 8.3× with respect to the mass ratio of the iron 308.

Figure 4:
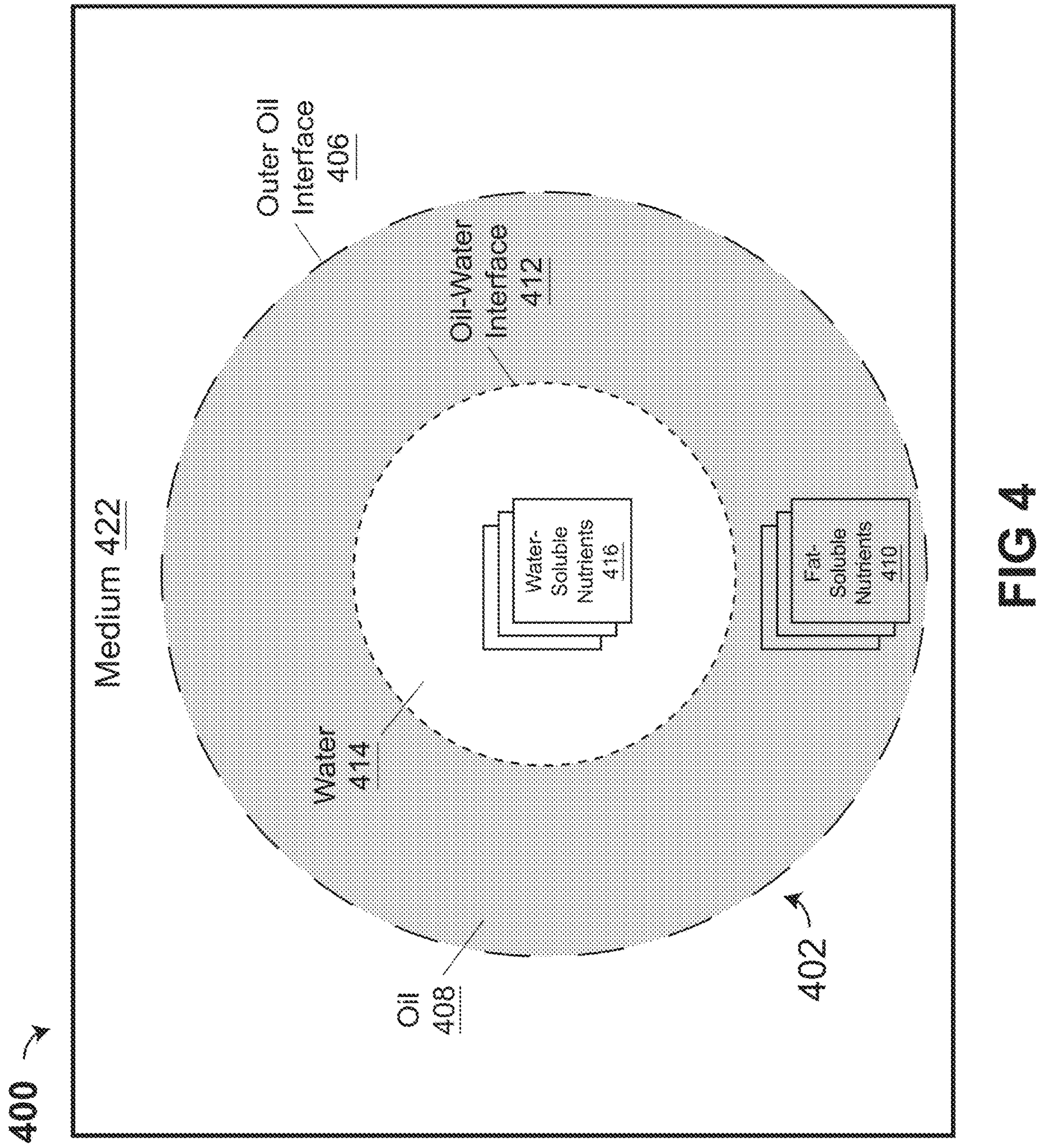
FIG. 4 shows phases of a nutrient emulsion for improved iron absorption, according to some embodiments of the present disclosure.

FIG. 4 shows representative elements of nutrient emulsion 402, according to some embodiments of the present disclosure. Referring inward from the exterior of nutrient emulsion 402, the particle contains an outer oil interface 406, an oil phase 408 (in which fat-soluble nutrients 410 are dissolved) an oil-water interface 412, and a water phase 414 (in which water-soluble nutrients 416 are dissolved). In some embodiments, emulsion 402 may be any one of emulsion 102, 202, or 302, or related embodiments thereof. The oil-water interface 412 flavor 320, carbohydrate 226, or any combination thereof. Though not shown, in some embodiments, additional phases and interfaces exist (e.g., a second oil-water interface may exist within water phase 414 and across from a second oil phase, within which a third oil-water interface may exist across a second water phase, and so on).

The outer oil interface 406 is in contact with medium 422 (e.g., water, air, potable liquid, vacuum, gastrointestinal fluid, or other fluids) and includes lecithin 112, 212, or 312, fiber 114, 214, or 314, flavor 320, carbohydrate 226, or any combination thereof. In an illustrative example, when medium 422 is water, outer oil interface 406 stabilizes particles of oil 408, which are otherwise insoluble in a water medium. In another illustrative example, when medium 422 is air, outer oil interface 406 prevents oxidation of oil 408, fat-soluble nutrients 410, and water-soluble nutrients 416. Outer oil interface 406 similarly prevents all the constituent materials of emulsion 402 from releasing into medium 422.

Oil 408 releases bioavailable iron upon being metabolized by enzymes or microbes in the small intestine, which contains the primary iron absorption site. This process releases water-soluble nutrients 416 (e.g., iron, vitamin C, protein) and similarly releases fat-soluble nutrients 410 (e.g., vitamins A, D, E, and K). In some embodiments, oil 408 may be oil 104, 204, or 304.

In response to digestion of oil 408, water 414 releases water-soluble nutrients 416, including iron 108, 208, or 308, vitamin C 110, 210, or 310, transition metal 216, inositol 220, antioxidants 222, micronutrients 322, or any combination thereof. In some embodiments, multiple water 414 particles are present inside a single oil 408 particle. In some embodiments, additional oil particles that are similar to (but smaller than) oil 408 exist inside one or more water 414 particles. Those oil particles may encapsulate additional water particles that are similar to (but smaller than) water particle 414.

Figure 5:
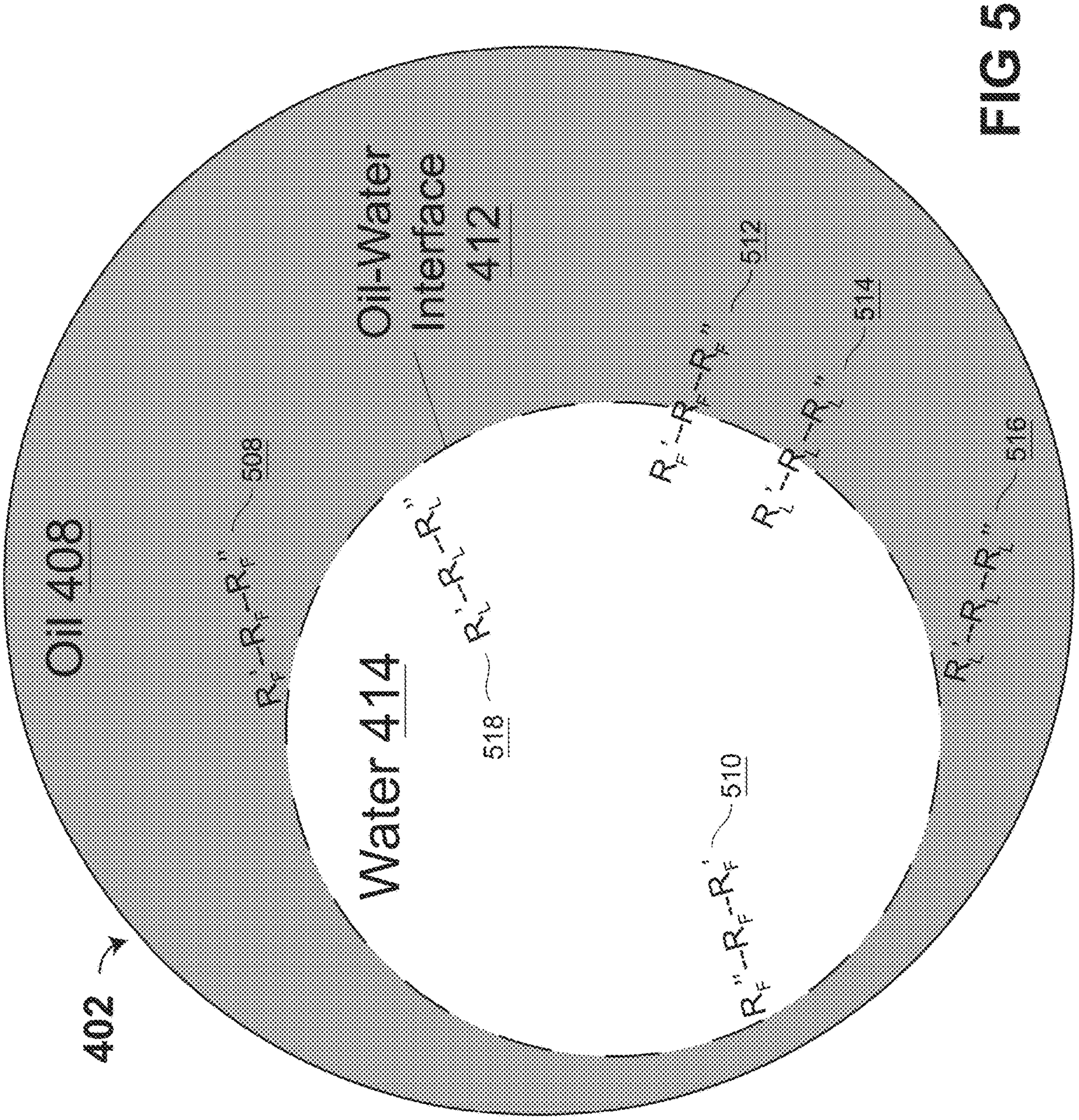
FIG. 5 shows interfacial components of a nutrient emulsion for improved iron absorption, according to some embodiments of the present disclosure.

FIG. 5 shows stabilizing elements of oil-water interface 412, according to some embodiments of the present disclosure. For illustrative purposes only, water particle 414 is displayed as being off-center with respect to oil particle 408. The oil-water interface 412 is either traversed or abutted by stabilizing molecules of lecithin 112, 212, or 312 (subscript 'L') and/or fiber 114, 214, or 314 (subscript 'F'). Each lecithin or fiber molecule contains at least three respective functional groups (R) that are linked by chemical bonds (—). Among these functional groups is a water-soluble group (i.e., R'), an oil-soluble group (i.e., R"), and a linking group (i.e., R).

FIG. 5 shows how certain stabilizing molecules—i.e., molecules 512 or 514—traverse the oil-water interface 412. Within these molecules, the water-soluble group may be dissolved in the water 414 phase, the oil-soluble group may be dissolved in the oil 408 phase, and the linking group may traverse the oil-water interface 412. FIG. 5 further shows how certain other stabilizing molecules—i.e., molecules 508, 510, 516, and 518—may abut the oil-water interface. Within these molecules, the group nearest to oil-water interface 412 may be soluble in the phase across the interface and the group furthest from oil-water interface 412 may be soluble in the other phase. For example, stabilizing fiber molecule 508 abuts oil-water interface 412 and is oriented such that the water-soluble group $R_F'$ abuts the interface while the oil-soluble group $R_F''$ is dissolved in the oil 408.

In FIG. 5, though certain respective functional groups of the stabilizing molecules are shown as spanning or being directly contiguous to oil-water interface 412, it will be understood that any respective group may reside in one or both electric double layers on either side of oil-water interface 412. In some embodiments, electrostatic or electrokinetic interactions between chemical elements of a functional group and interfacial oil- or water-phase charge result in stabilization of oil-water interface 412.

Figure 6:
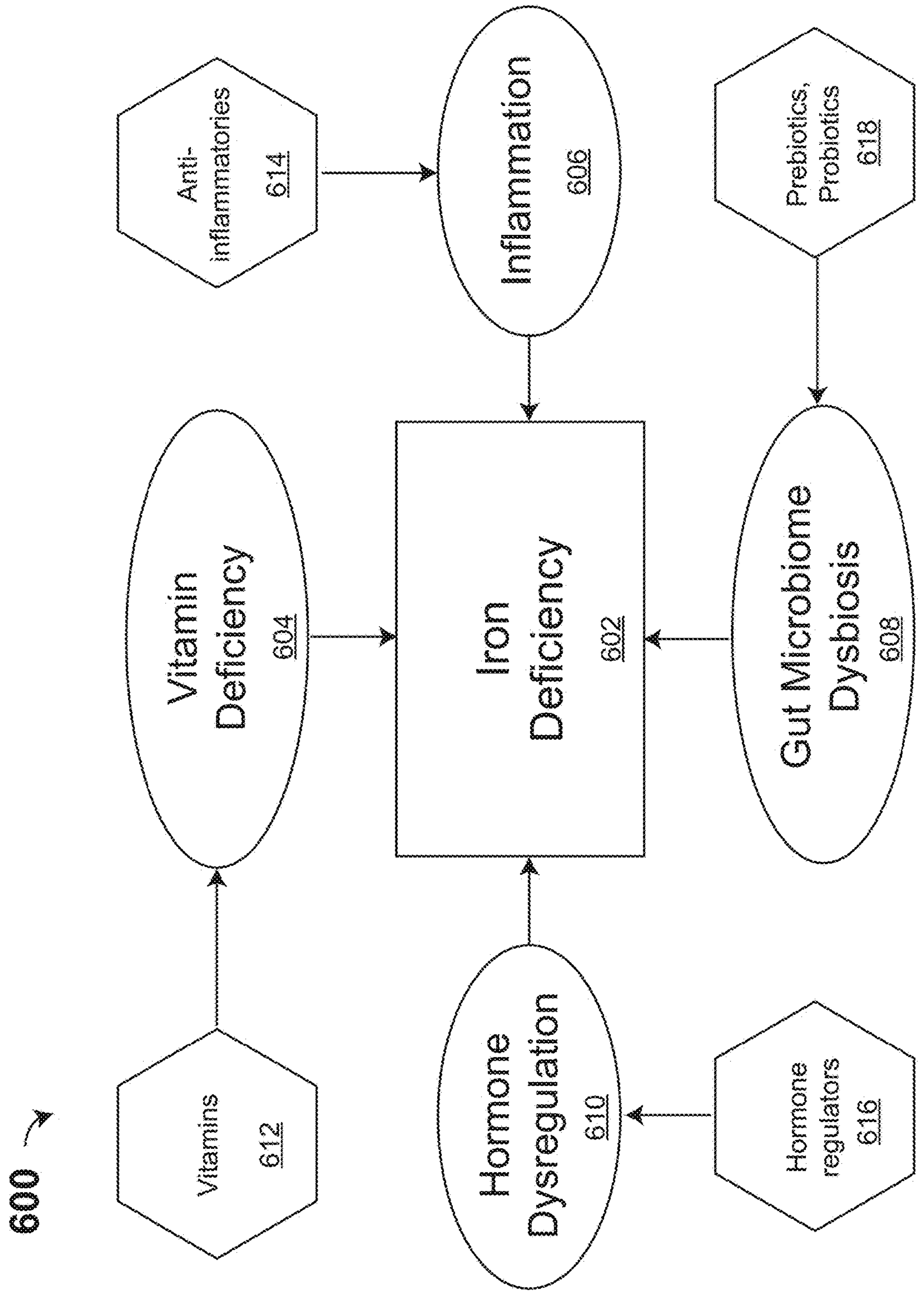
FIG. 6 shows factors contributing to iron deficiency, according to some embodiments of the present disclosure.

FIG. 6 shows physiological conditions contributing to iron deficiency (e.g., due to causing iron malabsorption) and corresponding nutrient-based solutions. In some embodiments, the nutrient-based solutions improve the bioavailability of iron 108, 208, or 308 and resolve iron deficiency 602 due to resolving iron malabsorption.

Vitamin deficiency 604 (e.g., deficiency of vitamins B9, B12, C, D, or E) may relate to iron deficiency 602 due to inhibiting the body from properlying using the iron that is available to it. Vitamins 612 (e.g., vitamins B9, B12, C, D, or E) may be administered with iron 108, 208, or 308 to resolve vitamin deficiency 604 and thus iron deficiency 602. For example, vitamins B9 and B12 are involved in the synthesis of red blood cells, which also requires iron; vitamin B9 or B12 deficiency may thus result in red blood cell deficiency or malformation. In another example, vitamin C is involved in regulation of hepcidin, a hormone that regulates how iron in the body is absorbed and utilized, and in the synthesis of ferritin, a hormone that stores iron; vitamin C deficiency may thus result in dysregulation of iron utilization and/or storage. In another example, vitamin E is involved in protection of red blood cells through antioxidative action; vitamin E deficiency may thus result in a compromised lifetime of blood cells.

Inflammation 606 may relate to iron deficiency 602 due to generating an immune response (e.g., expression of anti-inflammatory cytokines) that reduces iron availability and/or absorption. This may occur in populations that are prone to inflammation 606, such as elders, individuals with gastrointestinal diseases, and runners or high-intensity athletes. Anti-inflammatories 614 (e.g., glutathione, methoxatin, taurine, carnitine, lutein, glutamine, docosahexaenoic acid, lycopene, carotene, resveratrol, inositol, any other antioxidant, or any combination thereof) may be antioxidants administered with iron 108, 208, or 308 to resolve inflammation 606 and thus iron deficiency 602. For example, interleukins IL-1, IL-6, and IL-22 are generated in response to inflammation and promote the production of hepcidin, which inhibits iron absorption. In particular, IL-22 is related to gastrointestinal inflammation. In some embodiments, anti-inflammatories 614 may therefore also include prebiotic nutrients (e.g., fiber 114, 214, or 314 or oligosaccharide 318), which may further act as an anti-inflammatories 614 by suppressing inflammatory markers generated due to gastrointestinal inflammation.

Gut microbiome dysbiosis 608 may relate to iron deficiency 602 due to generating an immune response (e.g., to suppress pathogenic microbes or other pathogens) that reduces iron availability. This immune response may be a mechanism to starve out the pathogenic microbes by slowing their natural metabolic activities that require iron. For example, sepsis conditions induce iron deficiency 602 and may be resolved by prebiotics and probiotics 618. Prebiotics (e.g., gum arabic, pectin, inulin, medium-chain triglycerides, oligosaccharides, or any combination thereof) and probiotics (e.g., *B subtilis, L rhamnosus, L acidophilus, B lactis, B infantis, B breve, B longum, B bifidum, S salivarius*) may be administered with iron 108, 208, or 308 to resolve gut microbiome dysbiosis 608 and thus iron deficiency 602. For example, prebiotics are preferentially metabolized by probiotic microbes, allowing these microbes to metabolically outcompete pathogenic microbes and repair gut microbiome dysbiosis 608. In another example, probiotics (e.g., *B subtilis, L rhamnosus, L acidophilus, B lactis, B infantis, B breve, B longum, B bifidum, S salivarius*) increase the gut colonization of these microbe populations and similarly allow them to metabolically outcompete pathogenic microbes and repair gut microbiome dysbiosis 608.

Hormone dysregulation 610 may relate to iron deficiency 602 due to disrupting normal levels of hepcidin (which regulates iron absorption) and/or erythropoietin (which regulates hepcidin production). Hormone regulators 616 (e.g., inositol, docosahexaenoic acid, selenium, magnesium, vitamin D) may be administered with iron 108, 208, or 308 to resolve hormone dysregulation 610 and thus iron deficiency 602. For example, inositol is a component of growth factors that signal for phosphatidylinositol-4,5-bisphosphate 3-kinase (PI3K) production and PI3K suppresses hepcidin levels via suppressing HAMP signaling.

In some embodiments of the present disclosure, nutrition compositions are provided as in Table 1.

TABLE 1

Nutrient composition for an embodiment of an emulsion for bioavailable iron

| Component | Mass Ratio |
|---|---|
| Coconut Oil | 40% |
| Safflower Oil | 40% |
| Soy Lecithin | 5% |
| Gum Arabic | 5% |
| Ascorbic Acid | 5% |
| Water | 4% |
| Ferric Glycinate | 1% |

Figure 7:
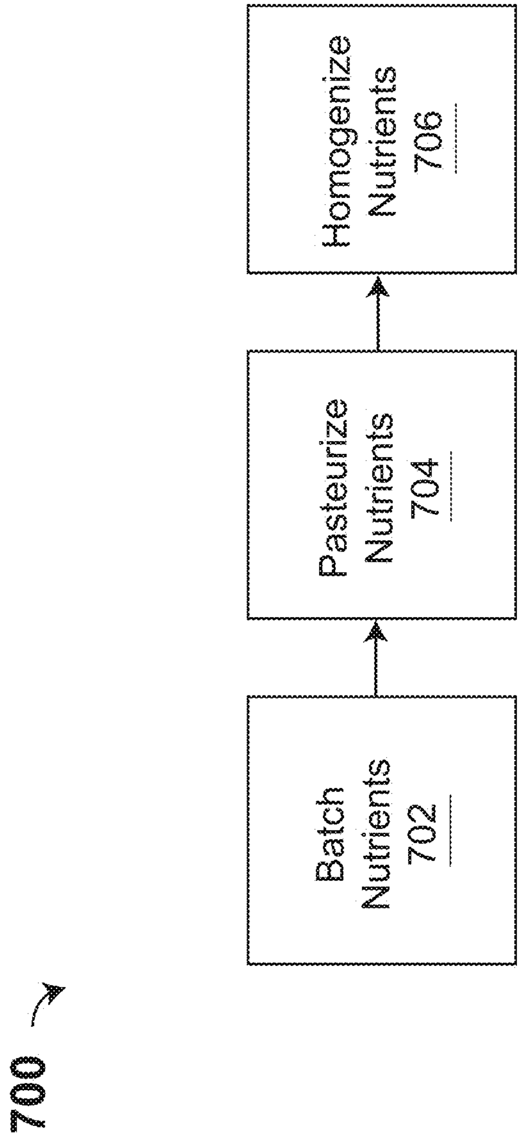
FIG. 7 shows an illustrative flowchart of a method for manufacturing a nutrient emulsion for providing bioavilable iron.

FIG. 7 shows a method for producing nutrient emulsions with improved iron absorption, in accordance with some embodiments of the present disclosure. At step 702, nutrients are batched. In some embodiments, the nutrients include those of emulsion 102, 202, or 302. In some embodiments, batching includes mixing nutrients in a medium such as water. At step 704, nutrients are pasteurized. In some embodiments, pasteurization is done so as to destroy microbes without damaging functional nutrients (e.g., by high-temperature short-time pasteurization, or by longer pasteurizations at lower temperatures). At step 706, nutrients are homogenized. In some embodiments, homogenization occurs upon application of high pressure and/or passage through specialized valves. For example, water 414 may become encapsulated by oil 408 during a homogenization step. In some embodiments, after step 706, the nutrients are spray dried into a powder. For example, such spray dried powder may have a bulk density of approximately 0.55 g/mL and an average particle size of 80 micrometer. In some embodiments, after spray drying, the nutrients are agglomerated into larger and more porous particles. For example, such agglomerated powder may have an average particle size of 120 micrometer. In some embodiments, functional ingredients including flavors 320, lecithin 112, 212, or 312, and/or fiber 114, 214, or 314, may be incorporated into a nutrient emulsion during an agglomeration step. In some embodiments, after spray drying or after spray drying and agglomerating, the nutrients may be dry blended. For example, probiotic 218 may be incorporated into a nutrient emulsion during a dry blending step.

As used herein and in the claims which follow, the construction "one of A or B" shall mean "A or B." The construction "the balance being" shall mean to comprise all remaining, unspecified mass.

It is noted that the foregoing is only illustrative of the principles of the invention, and that the invention can be practiced by other than the described embodiments, which are presented for purposes of illustration and not limitation, and the present invention is limited only by the claims which follow.

What is claimed is:

1. A nutrient emulsion for improved iron absorption, the nutrient emulsion comprising:
- an iron component present at a mass ratio of at least 0.03%;
- an ascorbic acid component present at a mass ratio of at least 25 times the mass ratio of the iron component;
- a water component present at a mass ratio from 0.5% to 5.0%;
- at least one of:
  - a lecithin component at a mass ratio of from 0.5% to 10%, or
  - a fiber component at a mass ratio of from 0.5% to 10.0%;
  - the lecithin component or the fiber component stabilizing one or more oil-water interfaces of the nutrient emulsion; and
- a balance being one or more oil components and impurities;
- the one or more oil components causing the nutrient emulsion to release the iron component in the small intestine following ingestion of the nutrient emulsion.

2. The emulsion of claim 1, further comprising at least one protein component at a mass ratio of from 15.0% to 50.0%, the at least one protein component providing amino acids for synthesis of ferritin and storage of the at least one iron component in the ferritin.

3. The emulsion of claim 1, further comprising at least one carbohydrate component at a mass ratio of from 15.0% to 50.0%, the at least one carbohydrate component binding the water component and the one or more oil components.

4. The emulsion of claim 1, wherein the iron is one of: ferrous glycinate, ferric glycinate, ferrous gluconate, ferric citrate, ferric ascorbate, ferrous protein succinylate, or heme iron derived from animal tissue.

5. The emulsion of claim 1, further comprising at least one transition metal at a mass ratio of from 0.05 to 0.25 times the mass ratio of the iron component, the at least one transition metal configured to activate ion transporter proteins to facilitate transport of iron across cell membranes, wherein the at least one transition metal is at least one of: zinc, copper, cadmium, manganese, and chromium.

6. The emulsion of claim 1, further comprising cholecalciferol at a mass ratio of at least 0.0011 times the mass ratio of the iron component, the cholecalciferol configured to further improve absorption of the iron component by reducing hepcidin levels.

7. The emulsion of claim 1, further comprising inositol at a mass ratio of at least 1.0%, the inositol configured to further improve absorption of the iron component by reducing hepcidin levels.

8. The emulsion of claim 1, further comprising at least one antioxidant at a mass ratio of at least 0.1%, wherein the at least one antioxidant is at least one of: glutathione, methoxatin, taurine, carnitine, lutein, glutamine, docosahexaenoic acid, lycopene, carotene, and resveratrol, the at least one antioxidant configured to further improve absorption of the iron component by reducing inflammation.

9. The emulsion of claim 1, wherein the fiber is at least one of: gum arabic or pectin, the emulsion further comprising another fiber selected from a group comprising: fructooligosaccharides, galactooligosaccharides, human milk oligosaccharides and inulin.

10. The emulsion of claim 1, dried into a dry powder and agglomerated into an agglomerated powder with a larger particle size and greater porosity than the dry powder, the agglomerated powder configured to dissolve in liquid better than the dry powder.

11. The emulsion of claim 1, further comprising at least one probiotic organism at a quantity of at least 1e9 CFU, wherein the at least one probiotic organisms is at least one of: *B subtilis, L rhamnosus, L acidophilus, B lactis, B infantis, B breve, B longum, B bifidum, S salivarius.*

12. The emulsion of claim 1, dried into a powder with average particle size of approximately 80 micrometers.

13. The emulsion of claim 1, the iron component present at the mass ratio of at least 0.3%, the ascorbic acid component configured to bind the iron component following the release in the small intestine to maintain solubility of the iron component proximal to duodenum or jejunum of the small intestine.

* * * * *